United States Patent
Long

[15] 3,694,422
[45] Sept. 26, 1972

[54] LIGHT ACTIVATION OF TETRAALKYLCHROMIUM COMPOUNDS IN POLYMERIZATION OF OLEFINS

[72] Inventor: Wendell P. Long, Wilmington, Del.
[73] Assignee: Hercules Incorporated, Wilmington, Del.
[22] Filed: Feb. 2, 1971
[21] Appl. No.: 112,019

[52] U.S. Cl. ............260/93.7, 204/159.24, 252/430, 252/431 R, 260/94.9 B, 260/94.9 DA, 260/438.5 R
[51] Int. Cl. ..............................C08f 1/42, C08f 3/06
[58] Field of Search.........260/94.9 B, 94.9 DA, 93.7; 204/159.24

[56] References Cited

UNITED STATES PATENTS 3,157,712    11/1964    Walker et al. ............260/94.9

FOREIGN PATENTS OR APPLICATIONS 810,268    3/1959    Great Britain

*Primary Examiner*—Joseph L. Schofer
*Assistant Examiner*—Edward J. Smith
*Attorney*—Edwin H. Dafter, Jr.

[57] ABSTRACT

The activity of tetraalkylchromium compounds as catalysts for the polymerization of 1-olefins is greatly enhanced by exposure of the catalyst, either prior to or during the polymerization, to light. Any source of light having a wave length of from about 280 to 600 nanometers can be used. Organometallic activators such as triethylboron or alkylaluminum compounds can be used to further activate these catalysts.

10 Claims, No Drawings

LIGHT ACTIVATION OF TETRAALKYLCHROMIUM COMPOUNDS IN POLYMERIZATION OF OLEFINS

This invention relates to a process of polymerizing 1-olefins and more particularly to the process wherein a tetraalkylchromium compound, activated by exposure to light, is used as the catalyst.

It is well known that 1-olefins can be polymerized at low pressure using as the catalyst a transition metal salt in combination with an aluminum alkyl compound as an activator. A new class of tetraalkylchromium compounds has recently been discovered, which compounds are effective as catalysts for the polymerization of 1-olefins, with or without the addition of an activator such as an alkylaluminum compound.

Now in accordance with this invention it has been discovered that the polymerization of 1-olefins with these new tetraalkylchromium compounds can be greatly enhanced by exposing the tetraalkylchromium compound to light just prior to, or during, the polymerization reaction. Any tetraalkylchromium compound can be so activated and used for the polymerization of 1-olefins. Generally these tetraalkylchromium compounds will have the formula

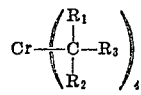

where $R_1$ and $R_2$ are each selected from H and methyl, and $R_3$ is selected from H, alkyl, cyclohexyl, alkylcyclohexyl, cyclohexylalkyl and dimethylbenzyl.

Typical of the tetraalkylchromium compounds that can be used are tetramethylchromium, tetraethylchromium, tetrapropylchromium, tetraisopropylchromium, tetra(n-butyl)chromium, tetra(isobutyl)chromium, tetra(sec.-butyl)chromium, tetra(tert.-butyl)chromium, tetra(isoamyl)chromium, tetra(neopentyl)chromium, tetra(3,3-dimethylbutyl)chromium, tetra(2-ethylbutyl)chromium, tetra(2-isopropyl)-3-methylbutyl)chromium, tetra(2,2-diethylbutyl)chromium, tetra(cyclohexylmethyl)chromium, tetra(4-methylcyclohexylmethyl)chromium, tetra(cyclohexylethyl)chromium, tetra(3-cyclohexylpropyl)chromium, tetra(4-cyclohexyl-butyl)chromium, tetra(2-methyl-2-phenylpropyl)chromium, also known as tetra(neophyl)chromium, etc.

The tetraalkylchromium compounds can be prepared by reacting an alkyllithium compound with a chromium salt. The reaction between the alkyllithium and the chromium salt is carried out in an inert aliphatic hydrocarbon diluent such as pentane, hexane, heptane, octane, etc. In general, the reaction is carried out at a low temperature such as −78° C. but any temperature from about −100° C. to about 30° C. can be used. Any anhydrous chromium salt can be used for the reaction, as, for example, chromous and chromic halides, the tetrahydrofuranates of chromous and chromic chlorides, chromium tetra-tert.-butylate, i.e., Cr(O-tert. $C_4H_9)_4$, chromium acetylacetonate, etc. Some of these tetraalkylchromium compounds are stable at ordinary temperatures and hence can readily be isolated by evaporation of the diluent and can be purified by sublimation, if desired. Others being less thermally stable are best handled in solution and stored at low temperature until used.

The following examples illustrate the preparation of the tetraalkylchromium compounds. All parts and percentages are by weight unless otherwise stated.

EXAMPLE 1

Neopentyllithium was prepared by reacting neopentyl chloride with lithium wire in pentane in a 1:2 molar ratio, stirring the mixture for 6 hours at 70°–80° C.

To a suspension of 1.875 g. of chromic chloride tetra-hydrofuranate ($CrCl_3 \cdot 3THF$) in 32 g. of pentane at −78° C. and under vacuum was added slowly 40 ml. of a 0.5 M solution of neopentyllithium in pentane. The purple solution was allowed to warm to room temperature during 1 hour. Gaseous carbon dioxide was then passed in to precipitate the excess alkyllithium. After centrifugating the mixture, the supernatant liquid was separated and evaporated to dryness under vacuum. The dark red solid that remained was transferred under argon to a sublimer. The product sublimed under high vacuum at 70° C. The yield of tetrakis(neopentyl)chromium so obtained amounted to 25 percent based on the $CrCl_3 \cdot 3THF$ used. It had a melting point of about 110°C. and starts decomposing at about 150° C. In heptane solution, it decomposes at temperatures above 150° C. in about 3 hours. On analysis, it was found to contain 15.28 percent chromium (theory is 15.48 percent). It showed a major mass spectral peak at 336 (theory 336). Electron spin resonance and magnetic susceptibility measurements showed that the chromium had a valence of four.

EXAMPLE 2

Example 1 was repeated except that tert.-butyllithium was used in place of the neopentyllithium used in that example. The tetrakis(tert.-butyl)chromium so obtained was wine red and sublimed at 55° C. under high vacuum. The yield was 10 percent. Analysis for chromium showed it to contain 18.53 percent (theory is 18.54 percent). Electron spin resonance and magnetic susceptibility showed that the chromium was tetravalent.

EXAMPLE 3

To a suspension of 1.875 g. of $CrCl_3 \cdot 3THF$ in 32 g. of pentane under vacuum at −78° C. was added slowly 40 ml. of a 0.5 M solution of isobutyllithium in pentane. The wine-red solution was allowed to warm to room temperature, the excess alkyllithium was precipitated with carbon dioxide and after centrifugation the supernatant solution containing the tetra(isobutyl)chromium (i.e., tetrakis(2-methylpropyl)chromium) was separated. The electron spin resonance spectrum showed that the chromium was tetravalent.

The tetraalkylchromium compounds comprise an unusual group of catalysts for the polymerization of 1-olefins. Any 1-olefin can be polymerized by means of these new catalysts as, for example, ethylene, propylene, butene-1, hexene-1, 3-methylpentene-1, octene-1, etc. and mixtures of these olefins.

The polymerization can be carried out in batch or continuous processes. Generally the polymerization process is carried out in the presence of a liquid diluent such as a liquid hydrocarbon, which can be any aliphatic, cycloaliphatic or aromatic hydrocarbon that is free of ethylenic unsaturation. Exemplary of such diluents are pentane, hexane, heptane, iso-octane, decane, cyclohexane, benzene, toluene, xylene, etc. A mixture of the olefin being polymerized and the liquid hydrocarbon can be allowed to flow over a fixed catalyst bed when the catalyst is extended on a solid support or the olefin can be passed into a solution of the catalyst in the liquid hydrocarbon. In the latter case, the process can be operated as a slurry process by operating at a temperature below that at which the polymer dissolves or as a solution process by operating at a temperature above that at which the polymer dissolves. When these catalysts are extended on a solid support they can be used, with an inert diluent or without a diluent, in a fluidized bed process. The tetraalkyl-chromium compounds can be extended on any oxidic carrier material as, for example, any silica, alumina, thoria, titania, etc., particulate material as well as the mixed aluminosilicates, etc. The amount of the chromium compound extended on the solid support can be varied as desired but generally will be from about 0.005 to about 0.5 millimole per gram of the carrier.

In some cases, the tetraalkylchromium compound can be used as the catalyst without any activator. However, yields and rates of polymerization are generally enhanced by using a combination of the tetraalkylchromium compound and an activator. Again, because of the versatility of these catalysts, a wide variety of activators can be used. Exemplary of the activators that can be used are mercury and zinc dihydrocarbon compounds, boron trihydrocarbons, organoaluminum compounds, and lead, tin or germanium tetrahydrocarbon compounds. Thus, any compound having the formula $MR_n$, where M is Hg, Zn, B, Al, Pb, Sn or Ge, R is a hydrocarbon radical free of ethylenic unsaturation and $n$ is the valence of M, can be used. Examples of these compounds are those where the R's are alike or different and can be alkyl, cycloalkyl, alkylcycloalkyl, aryl, aralkyl and alkaryl such as methyl, ethyl, propyl, n-butyl, tert.-butyl, cyclohexyl, phenyl, benzyl, tolyl, etc. In addition, aluminum compounds having the formula

where R is an alkyl, alkenyl, cycloalkyl, aryl, aralkyl, alkaryl, etc. group and X and Y are R (which can be the same or different), halide, H, alkoxide, etc. can be used. Of particular importance are the alkylaluminum dihalides or trialkylaluminum compounds. Exemplary of the organoaluminum compounds that can be used are trimethylaluminum, triethylaluminum, tri(n-butyl)aluminum, triisobutylaluminum, ethylaluminum dichloride, methylaluminum sesquichloride, ethylaluminum sesquichloride, diisobutylaluminum hydride, trihexylaluminum, tridodecylaluminum, trioctylaluminum, aluminum isoprenyl, triphenylaluminum, tribenzylaluminum, tri(cyclohexyl)-aluminum, etc. Another type of organoaluminum compound that can be used to activate the polymerization is the reaction product of a trialkylaluminum with from about 0.05 to about 1.5 moles of water, which reaction may be carried out *in situ* or the reaction can be carried out prior to the polymerization process. When an organometallic activator is used it generally will be used in an amount such that the molar ratio of it to the chromium compound will be within the ratio of from about 0.5:1 to 100:1 and preferably from about 1:1 to about 10:1.

The temperature at which the polymerization is carried out will depend upon the type of process used, but generally will be within the range of from about 0° to about 120° C., although higher or lower temperatures can be used. Any pressure, from subatmospheric to as high as 30 atmospheres or more, can be used. Any amount of the chromium compound can be used to catalyze the polymerization from a minor catalytic amount to a large excess, if desired.

As pointed out above, regardless of the polymerization process used, solution, or catalyst extended on a solid carrier, the activity of the tetraalkylchromium catalysts is greatly enhanced by exposure of the tetraalkylchromium compound to light, either before or during the polymerization process. In fact, the activity of the catalyst is increased by such treatment anywhere from two to as much as ten times or more the activity of the catalyst that has not been so exposed to light. If the polymerization is carried out in solution, a hydrocarbon solution of the tetraalkylchromium compound can be exposed to light and this solution used to catalyze the polymerization. In this case, care must be exercised in not over-exposing the tetraalkylchromium to light. This can be done by following the color change that takes place, the red color of the tetraalkylchromium fading to an almost colorless to pale amber solution which is a very active catalytic species. If the solution is over-exposed, a green precipitate is formed, which is an inactive species for the polymerization reaction. A simpler and more easily controlled process is to expose the catalyst to light in the presence of the monomer being polymerized, much less care with respect to the radiation being required. Thus, the entire polymerization mixture comprising the olefin(s), tetraalkylchromium catalyst, diluent, and activator, if used, is irradiated.

The tetraalkylchromium can also be extended on a solid support such as silica as explained above. In this case, a mixture of a hydrocarbon solution of the tetraalkylchromium compound and the solid carrier can be irradiated. Again care should be exercised in this irradiation, exposing the mixture only until the pink to amber color is reached. Another method of preparing the active catalyst species extended on a support is to react the tetraalkylchromium and the carrier thermally and then expose the so extended catalyst to light in order to activate it. Instead of activating the catalyst extended on the support prior to the polymerization reaction, the catalyst-on-support can be irradiated in the presence of the monomer(s) by irradiating the mixture of diluent, olefin(s), extended catalyst and activator, if one is used.

Any convenient source of light that has a wave length longer than that of ultraviolet light can be used for irradiation of the tetraalkylchromium compound. Preferably, the light will have a wave length of from about 280 to about 600 nm. (nanometers).

The following examples will illustrate the process of polymerizing 1-olefins with the tetraalkylchromium catalysts in the presence of light in accordance with this invention.

EXAMPLE 4

A glass polymerization vessel filled with argon was charged with 50 ml. of n-heptane and $3.0 \times 10^{-5}$ moles of tetra(tert.-butyl)chromium and then was pressured with ethylene to 30 p.s.i.g. The vessel was exposed to a 275 watt sunlamp placed 12 inches from the vessel for 162 minutes, during which time the temperature increased from 25° to 45° C. The polyethylene so produced amounted to 9.5 g. per millimole of chromium at a rate of 1.7 g./mmole Cr/atm./hr.

EXAMPLE 5

A glass polymerization vessel of 340 ml. capacity equipped with a magnetic stirring bar and filled with argon was charged with 50 ml. of n-heptane which had been freed of impurities. The following reagents were added in order: $2.0 \times 10^{-5}$ moles of triethyaluminum, $1.0 \times 10^{-5}$ moles of tetra(tert.-butyl) chromium and ethylene to a pressure of 30 p.s.i.g. After all ingredients had been charged, the vessel was exposed to a 275 watt sunlamp placed 12 inches from the vessel. The reaction was continued until the solution was colorless; 162 minutes. The polyethylene so produced amounted to 1.250 g. or 125 g. per millimole of chromium produced at a rate of 23 g./mmole Cr/atm./hr.

When the process was repeated in the absence of light, after 7 hours the yield of polyethylene was 0.71 g. or 71 g. per millimole of chromium produced at a rate of 2.1 g./mmole Cr/atm./hr.

EXAMPLE 6

A glass polymerization vessel equipped with a magnetic stirring bar and filled with argon was charged with 50 ml. of n-heptane, $1 \times 10^{-5}$ moles of tetraneopentylchromium and $2 \times 10^{116\ 5}$ moles of ethylaluminum dichloride. The vessel and contents were equilibrated at 4° C. and exposed to a 275 watt sunlamp positioned 12 inches from the vessel. After 0.6 hour the lamp was removed and ethylene was introduced to a pressure of 30 p.s.i.g. and the temperature was raised to 50° C. After 2.3 hours at that temperature, the vessel was vented, cooled, and the polyethylene was isolated. It amounted to a productivity of 73 g. per millimole of chromium and a rate of 16.0 g./mmole Cr/atm./hr.

When the process was repeated but the step of exposing the catalyst solution to light was omitted and the polymerization was carried out in the absence of light, there was obtained after 3.3 hours an amount of polyethylene equal to 13.4 g. per millimole of chromium at a rate of 2.0 g./mmole Cr/atm./hr.

EXAMPLE 7

The general procedure of Example 6 was followed but using $2 \times 10^{-5}$ moles of triethylaluminum as activator instead of the ethylaluminum dichloride used in that example. In this case the irradiation was carried out at −10° C. for 0.7 hour under ethylene pressure of 30 p.s.i.g. The lamp was removed and with the temperature raised to 50° C. The polymerization was continued for 2.8 hours. The polyethylene so obtained amounted to a productivity of 186 g. per millimole of chromium and a rate of 33 g./mmole Cr/atm./hr.

EXAMPLE 8

The procedure of Example 6 was repeated except that the activator was trimethylaluminum in place of the ethylaluminum dichloride used in that example. The irradiation was carried out at 2° to 6° C. for 1.2 qhours, after which the lamp was removed, ethylene introduced at a pressure of 30 p.s.i.g. and the polymerization was carried out at 50° C. for 1.9 hours. The polyethylene so obtained amounted to a productivity of 35 g. per millimole of chromium and a rate of 9.2 g./mmole Cr/atm./hr.

EXAMPLE 9

Example 8 was repeated except that diisobutylaluminum hydride was used as the activator, the irradiation was carried out for 0.6 hour and the polymerization for 2.8 hours. The polyethylene so obtained amounted to a productivity of 21 g. per millimole of chromium and a rate of 4.1 g./mmole Cr/atm./hr.

EXAMPLE 10

One-half gram of a silica that had been annealed at 700° C. and then, just before use, was dried at 200° C. for 5 hours, was mixed with 300 ml. of n-heptane and $3 \times 10^{-5}$ moles of tetra(neopentyl)chromium in a glass polymerization vessel. The vessel was then exposed to daylight (north light) for 2 hours at 20° C., after which the reaction mixture was heated at 80° C. for 1 hour. Ethylene was introduced to a pressure of 30 p.s.i.g. After 2.1 hours, at 80° C., the polyethylene produced was isolated. It amounted to 190 g. per millimole of chromium at a rate of 60 g./mmole Cr/atm./hr.

EXAMPLE 11

One-half gram of a silica that had been dried at 200° C. for 4 hours was mixed with 300 ml. of n-heptane and $3.0 \times 10^{-5}$ moles of tetra(neopentyl)chromium in a glass polymerization vessel. The mixture was then exposed to a 275 watt sunlamp positioned 12 inches from the reactor for 3 hours at 25° C. After pressuring with ethylene to 30 p.s.i.g., and with the reaction temperature at 80°C., there was injected $1 \times 10^{-4}$ moles of triethylboron. The yield of polyethylene after 0.8 hour's reaction was 213 g. per millimole of chromium at a rate of 165 g./mmole Cr/atm./hr.

EXAMPLE 12

A polymerization vessel equipped with a magnetic stirrer was charged with 0.5 g. of a commercial pyrogenic silica, that had been dried for 4 hours at 200°–210° C., and $5 \times 10^{-5}$ moles of tetra(neopentyl)chromium in 300 ml. of n-heptane. The mixture was stirred for 17 hours at 50° C., and then was exposed to light as described in Example 10 for 1.65 hours at 20°C. There was then added $1 \times 10^{-4}$ moles of triethylboron and $1 \times 10^{-4}$ moles of triethyl-aluminum and propylene was introduced to a pressure of 40 p.s.i.g. The temperature, 50° C., and pressure were maintained for 19.3 hours. The polypropylene so produced amounted to 290 grams per millimole of chromium and the rate was 5.5 g./mmole Cr/atm./hr.

When the process was repeated except that the catalyst was not exposed to light, there was obtained after 21.5 hours reaction time, 66 grams of polypropylene per millimole of chromium at a rate of 1.1 g./mmole Cr/atm./hr.

EXAMPLE 13

A 340 ml. glass reactor filled with argon was charged with 50 ml. of heptane and 0.4 g. of a commercial pyrogenic silica and pressured with ethylene to 30 p.s.i.g. at 23 ° c. There was the injected $8 \times 10^{-6}$ moles of tetra-neophyl)chromium and the vessel was exposed to a 275 watt sunlamp placed 12 inches from the vessel. In about 30 minutes the red color characteristic of hydrocarbon solutions of tetraalkylchromium compounds had disappeared and the silica became pink in color. There was then injected $2 \times 10^{-5}$ moles of triethylaluminum. After a total of 1.5 hours, the polymerization was terminated. The polyethylene so produced amounted to a productivity of 49 g. per millimole of chromium and the rate was 16 g./mmole Cr/atm./hr.

What I claim and desire to protect by Letters Patent is:

1. The process of polymerizing 1-olefins which comprises contacting at least one 1-olefin with a catalyst comprising a tetraalkylchromium compound activated by irradiation with light having a wave length of from about 280 to about 600 nanometers.

2. The process of claim 1 wherein the catalyst is further activated by the addition of an organometallic activator selected from the group consisting of an organoaluminum compound and a trihydrocarbonboron.

3. The process of claim 1 wherein ethylene is polymerized.

4. The process of claim 1 wherein propylene is polymerized.

5. The process of claim 1 wherein the process is carried out in solution in a hydrocarbon solvent free of ethylenic unsaturation.

6. The process of claim 5 wherein the tetraalkylchromium compound is irradiated with light in the presence of the 1-olefin.

7. The process of claim 1 wherein the tetraalkylchromium is extended on an oxidic carrier material.

8. The process of claim 7 wherein the carrier material is silica.

9. The process of claim 8 wherein the tetraalkylchromium extended on silica is irradiated with light prior to use in the polymerization process.

10. The process of claim 8 wherein the tetraalkylchromium extended on silica is irradiated with light in the presence of the 1-olefin.

* * * * *